(12) United States Patent
Hornbostel et al.

(10) Patent No.: US 9,452,380 B2
(45) Date of Patent: Sep. 27, 2016

(54) MONOLITHIC NATURAL GAS STORAGE DELIVERY SYSTEM BASED ON SORBENTS

(71) Applicant: SRI INTERNATIONAL, Menlo Park, CA (US)

(72) Inventors: Marc Hornbostel, Palo Alto, CA (US); Gopala N. Krishnan, Sunnyvale, CA (US); Angel Sanjurjo, San Jose, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 25 days.

(21) Appl. No.: 14/696,425

(22) Filed: Apr. 25, 2015

(65) Prior Publication Data

US 2015/0258487 A1    Sep. 17, 2015

Related U.S. Application Data

(63) Continuation of application No. PCT/US2013/064729, filed on Oct. 11, 2013.

(60) Provisional application No. 61/712,932, filed on Oct. 12, 2012.

(51) Int. Cl.

| F17C 11/00 | (2006.01) |
| B01D 53/02 | (2006.01) |
| B01D 53/04 | (2006.01) |
| B01J 20/20 | (2006.01) |
| B01J 20/32 | (2006.01) |
| B01J 20/28 | (2006.01) |
| B01J 20/02 | (2006.01) |
| B01J 20/18 | (2006.01) |

(52) U.S. Cl.
CPC ............ *B01D 53/0407* (2013.01); *B01J 20/02* (2013.01); *B01J 20/18* (2013.01); *B01J 20/20* (2013.01); *B01J 20/2808* (2013.01); *B01J 20/28011* (2013.01); *B01J 20/28042* (2013.01); *B01J 20/28045* (2013.01); *B01J 20/28057* (2013.01); *B01J 20/28061* (2013.01); *B01J 20/28066* (2013.01); *B01J 20/28088* (2013.01); *B01J 20/3204* (2013.01); *B01J 20/328* (2013.01); *B01J 20/3236* (2013.01); *B01J 20/3268* (2013.01); *B01J 20/3291* (2013.01); *F17C 11/005* (2013.01); *F17C 11/007* (2013.01); *B01D 2253/102* (2013.01);

(Continued)

(58) Field of Classification Search
CPC ............. B01D 53/04; B01D 53/0407; B01D 2253/102; B01D 2253/306; B01D 2253/308; B01D 2253/31; B01D 2253/311; B01D 2253/342; B01D 2257/0725; B01D 2259/4525; Y02C 20/20; F17C 11/005; F17C 11/007; B01J 20/02; B01J 20/18; B01J 20/20; B01J 20/28011; B01J 20/28042; B01J 20/28045; B01J 20/28057; B01J 20/28061; B01J 20/28066; B01J 28/2808; B01J 20/28088; B01J 20/3204; B01J 20/3236; B01J 20/3268; B01J 20/328; B01J 20/3291; Y10T 428/249954; Y10T 428/249979
USPC ........ 96/108, 146; 95/90, 139, 143; 206/0.7; 423/658.2; 429/515
See application file for complete search history.

(56) References Cited

U.S. PATENT DOCUMENTS

| 6,503,584 B1 * | 1/2003 | McAlister ................. F17C 1/02 |
| | | 220/560.04 |
| 7,172,645 B1 * | 2/2007 | Pfister .................... B01D 53/02 |
| | | 95/116 |

(Continued)

*Primary Examiner* — Frank Lawrence
(74) *Attorney, Agent, or Firm* — Richard Aron Osman (57) ABSTRACT

The invention provides methods for producing a strong, light, sorbent-based storage/dispenser system for gases and fuels. The system comprises a porous monolithic material with an adherent strong impervious skin that is capable of storing a gas under pressure in a safe and usable manner.

20 Claims, 3 Drawing Sheets

(52) U.S. Cl.
CPC .. *B01D 2253/306* (2013.01); *B01D 2253/308* (2013.01); *B01D 2253/31* (2013.01); *B01D 2253/311* (2013.01); *B01D 2253/342* (2013.01); *B01D 2257/7025* (2013.01); *B01D 2259/4525* (2013.01); *Y02C 20/20* (2013.01); *Y10T 428/249954* (2015.04); *Y10T 428/249979* (2015.04)

(56) References Cited

U.S. PATENT DOCUMENTS

| | | | |
|---|---|---|---|
| 7,954,519 B2* | 6/2011 | Powell | F17C 1/00 141/11 |
| 2002/0020292 A1* | 2/2002 | Wojtowicz | B01D 53/02 95/116 |
| 2003/0145731 A1* | 8/2003 | Biasio | B01D 53/0415 96/130 |
| 2004/0045438 A1* | 3/2004 | Place | B01D 53/0438 95/141 |
| 2008/0203101 A1* | 8/2008 | Kimbara | C01B 3/0005 220/586 |
| 2008/0302246 A1* | 12/2008 | Carruthers | B01D 53/0415 96/154 |
| 2011/0303558 A1* | 12/2011 | Carruthers | B01D 53/02 206/0.7 |
| 2013/0220479 A1* | 8/2013 | Luo | F17C 1/00 141/4 |
| 2014/0060322 A1* | 3/2014 | Wanni | B01D 53/047 95/8 |

* cited by examiner

Figure 3

US 9,452,380 B2

MONOLITHIC NATURAL GAS STORAGE DELIVERY SYSTEM BASED ON SORBENTS

CROSS-REFERENCE TO RELATED APPLICATIONS

This application is a continuation of PCT/US13/64729, filed Oct. 11, 2013 and claims priority to U.S. Ser. No. 61/712,932 filed Oct. 12, 2012, the contents of which are incorporated herein by reference.

This invention was made with government support under Grant No. DE-AR0000250 awarded by ARPA-E/Department of Energy. The government has certain rights in the invention.

BACKGROUND

There is a need for methods to reliably store gases that do not require high pressures to minimize the cost of compression and the cost of strong bulky tanks and to increase safety. Furthermore, for mobile applications, these storage systems should be light, small and rugged. The background of this invention can be better illustrated if we use natural gas and a carbon adsorbent as an example but it should be understood that the invention applies to many other gases and porous substrates.

Currently, natural gas can be compressed as a liquid at low temperatures as liquefied natural gas (LNG), which contains about 72% of the energy of gasoline. The major limitation of using LNG is that the liquefaction procedure is costly, it requires expensive treatment stations, it has the inherent danger of developing high pressures if it warms up and, therefore, although this approach is used industrially and even in trucks, it is not easily adaptable to small passenger vehicles.

Natural gas (NG) can also be stored by compressing it up to 3,000 psi at room temperature, forming compressed natural gas (CNG); as a supercritical gas, its density with respect to NG increases by about 230 times, and it contains about 28% of the energy of gasoline. High pressure CNG can already provide an acceptable performance for vehicles. The major drawback of this approach is that it needs expensive pumping stations that would require a major change in the infrastructure of the USA and large bulky storage tanks that occupy a significant volume of the trunk, or there is a need to redesign the car to accommodate the volume of the tank.

To circumvent all these limitations, the adsorption of NG in sorbents with high surface areas has been investigated. The quantity of methane adsorbed as a function of surface area has been measured for various high-surface-area sorbents including silica gel, carbon, molecular sieves, and metal-organic framework (MOF) sorbents. As much as 0.2 $gCH_4/g$ sorbent can be adsorbed at 35 bar at 298 K. At a pressure of 35 bar, the effect of surface area is more important than the composition of the sorbent. The bulk densities of silica-based materials range from 0.2 to 0.5 g/cm3 whereas for carbon based sorbents, it can range from 0.3 to 1.1 g/cm3. For the current applications, the mass of natural gas stored per unit volume of the sorbent is a critical parameter, as the container space is limited.

From the results available in the literature, it can be concluded that the goal of energy density will be difficult to reach using silica-gel, a molecular sieve, or MOF-based sorbents because they cannot be obtained as rugged solids at the surface areas needed to absorb enough methane. Furthermore, both zeolites and MOF are weak and unstable in water vapor and in the presence of impurities such as $H_2S$, $CO_2$, etc.

Carbon sorbents can be obtained industrially with high surface areas (e.g., >1500 $m^2/g$) and high densities (e.g., >1 kg/l) and are chemically stable under the conditions of absorption.

Relevant art: U.S. Pat. Nos. 6,743,278 and 7,494,530.

SUMMARY

In an aspect, the invention provides a gas storage and delivery device comprising a porous gas sorbent monolith contained within an adherent skin, wherein: the skin is impervious to the gas at >35 atm and comprises a port providing a fluid connection between the monolith and a gas charge/discharge manifold; and the monolith comprises properties: (a) a surface area of >100 $m^2/g$; (b) a density of 0.5 g/cc; (c) interconnected pores with some hierarchical structure typically of diameter larger than 0.5 and smaller than 1.5 nm; (d) tensile modulus>2 Mpsi, tensile strength>1 kpsi and flexural strength>2 kpsi; and (e) chemical stability in that it does not degrade, or is not significantly attacked by species present, in a gas that is natural gas, hydrogen or $CO_2$.

In embodiments:

the chemical stability includes stability against degradation by electrochemical corrosion;

the monolith is thermally conductive;

the skin comprises one or more openings (i.e., conduits or ports) to facilitate gas flow (charging and/or discharging) and/or thermal conduction;

the openings in the skin are configured for insertion or attachment of heat pipes or other thermal regulation devices;

the skin is impervious to the gas at ≥100 atm;

the hierarchical structure of the interconnected pores is a fractal structure;

the monolith comprises a surface area of ≥1000 or ≥1500 $m^2/g$;

the monolith comprises a density of ≥1 g/cc;

the monolith comprises a material that is mostly one or more light elements selected from C, B, Si, Mg, Al, and Ti;

the monolith comprises a material that is mostly one or more light elements selected from C, B, Si, Mg, Al, O, N, and Ti;

the monolith comprises a material selected from carbon, silicon carbide, silicon nitride, $SiON_x$, AlON, AlN, $Al_2O_3$, MgO, and BC;

the monolith comprises one or more material(s) selected from carbon, silicon carbide, silicon nitride, $SiON_x$, AlON, AlN, $Al_2O_3$, MgO, BC, and strong polymers or composites;

the monolith is made of carbon and the surface area is over 1000 $m^2/g$ (preferably over 1300, 1500 or 2000 $m^2/g$);

the monolith is made of carbon that is a pyrolysis product of a natural product (such as olive pits, corn cobs, etc.), or a polymeric precursor (such as PVC), or a combination thereof;

the skin comprises a material selected from a polymer (Kevlar, Zylon), a metal, and carbon;

the skin comprises a material selected from a polymer (epoxies, organic compounds containing B, Si, Al, or Ti, Kevlar, Zylon), a metal or alloy or metal-containing compound, and carbon;

the skin contains an epoxy and a filler consisting of particles, flakes, fibers, tapes, or chop fibers ranging in size from nanometers to meters and most preferably 100 nm to 1 cm, and made of carbon materials such as carbon, metals, and compounds such as silicates or aluminosilicates;

the skin comprises a material selected from metals such as Ti, V, W, Ta, Co, Ni, Al or any of its alloys or compounds such as TiN, TiC, TiON, etc., VN, WN, WC, or any graded or layered composite thereof;

the skin is less than 5 mm thick, and preferably less than 1 mm thick and most preferably less that 100 micron thick;

the skin is reinforced by a second layer of material that include conventional wrapping materials and techniques to form gas tanks including, C-epoxy, glass fiber-polymer, strong polymer fibers such as Kevlar, Zylon, steel wires, belts, tapes, metallurgical coatings or any similar reinforcement;

the skin is reinforced by a second layer of material that include conventional wrapping materials and techniques to form gas tanks including metal casing, metal foils, plates, C-epoxy, glass fiber-polymer, strong polymer fibers such as Kevlar, Zylon, steel wires, belts, tapes, metallurgical coatings or any similar reinforcement, and combinations;

the second skin is used for extra mechanical strength, and mechanical and thermal attachment to the rest of the system, and may include ports and channels or ribs for external gas manifolding through vias in the first skin, or attached fins or heat pipes;

the device comprises the manifold in the form of a tube with a valve which sustains at least 35 bar of pressure (preferably at least 100 bar);

the device comprises an internal manifold formed in the green body before pyrolysis by including fugace or porous phases in the polymeric precursor form or, after pyrolysis, by drilling and consisting of conduits less than 1 cm in diameter and preferably less than 1 mm and most preferably less than 100 microns, wherein the conduits can run in parallel or in a fractal pattern or can be combined patterns and be separated by less than 10 cm and possibly by less than 3 cm;

the device comprises the manifold in the form of a tube with a flange, and a ring of a metal (such as Cu, Ni, Co, Fe, Al or Ti) around the port configured so that the ring and flange can be mated (glued, soldered, or brazed) so that manifold is gas tight to pressures over 35 bar;

the device comprises the manifold in the form of a tube with a flange, and a ring of a metal (such as Cu, Ni, Co, Fe, Al or Ti) or a carbon composite or polymer composite around the port configured so that the ring and flange can be mated (glued, soldered, or brazed) to the main body of the monolith so that manifold is gas tight to pressures over 35 bar;

the device comprises a surface treated tube to increase the strength and the adhesion of the tube to the sorbent body and to decrease tendency to delaminate or leak gas through such interface. Such surface treatment can be mechanical or chemical and include any known or to be developed practical method;

wherein the mechanical treatment consist of producing threads or grooves at least 300 microns deep;

wherein the surface or the tube is coated with an epoxy, or a silazane or a mixture that is well adapted to adhere to the steep and an epoxy that adheres well to the sorbent body;

wherein the device further comprises a circulating conductive fluid (i.e., heat conducting) that bathes the monolith and is contained by an external casing, which provides heat transfer during charging and discharging the gas;

wherein the device further comprises a circulating conductive fluid (i.e., heat conducting) that bathes the monolith or the casing and is contained by an external casing, which provides heat transfer during charging and discharging the gas;

wherein the external casing or skin is pressure resistant, is hard and scratch resistant, is impact resistant, thermally conductive and/or provided with channels and or ribs that can act for heat dissipation and or mechanical strengthening and or assembly/attachment to the rest of the body of the system;

wherein a soft, vibration mitigation interface is provided that consists of a material such as foam, a spring or any other form of vibration mitigation;

wherein the device further comprises resistance heaters which provide heating during gas discharge and heat pipes in the monolith which provide cooling;

wherein the device further comprises the gas at >35 atm.

An aspect of the invention provides a gas storage and delivery device comprising a microporous or nanoporous gas sorbent monolith contained within an adherent skin, wherein: the skin is impervious to the gas at >35 atm, and comprises one or more ports, each providing a fluid connection between the monolith and a gas charge/discharge manifold; and the monolith comprises microporous or nanoporous carbon.

In embodiments:

the skin is impervious to the gas at ≥100 atm;

the monolith consists essentially of microporous or nanoporous carbon, wherein the carbon is substantially the only component of the monolith which contributes substantially to the sorbtion of the gas;

the microporous carbon comprises properties: Bulk Density 1.12 g/cm$^3$; Heat Capacity 0.9-1.2 cal/g·K; Coefficient of Thermal Expansion $3.2\times10^{-6}$/K; Ash Content (ASTM D2866-94)<0.1%; Thermal Conductivity 1.2 W/mK; Pore Size Distribution 0.5-0.8 nm w/0.02 nm precision; BET-N2 Surface Area 1026 m$^2$/g; and Micropore Volume (fraction) 0.41 cm$^3$/g (45%);

the pore size distribution is narrow and tunable;

wherein the device further comprises the gas at >35 atm.

An aspect of the invention provides a method of using the device as above for storing and delivering a gas comprising: introducing the gas into the device under pressure>35 atm.

An aspect of the invention provides a method of making the device as above comprising the step of forming the skin on the monolith by coating the monolith with a polymeric precursor that can be converted into a strong polymer and a nanocomposite with the monolithic sorbent material surface and/or can be pyrolyzed. In an embodiment, the strong polymer is Kevlar, Zylon, or the like. In an embodiment, the strong polymer is selected from epoxies, or silicon or boron compounds such as silazanes, siloxanes, or organoboranes.

An aspect of the invention provides a method of making the device as above comprising the step of forming the skin on the monolith by coating (including dip coating, CVD, PVD, plasma spraying, pyrolysis of precursors of carbon including graphene sheets, diamond like coatings, or epoxies or other glues).

In an aspect there is provide a gas storage and delivery device as disclosed herein, wherein: the device further comprises a vibration mitigation interface. In embodiments, the vibration mitigation interface comprises a vibration mitigating material such as foam or spring.

An aspect of the invention provides a gas storage and delivery device as disclosed herein, wherein the monolith comprises material encased in a macroscopic sponge. In an embodiment: a) the material is a high surface area carbon or a carbon precursor and sponge is a SiC sponge; b) the material is a high surface area carbon or a carbon precursor or zeolite or MOF with angstrom-sized pores and the sponge is a foam of Al or Ti metal (with or without a nitride coating)

with open pores larger than 1 micron and preferably more than 1 mm and low apparent density.

An aspect of the invention provides a gas storage and delivery device disclosed herein wherein: a) the monolith comprises a composite or several blocks glued together; and/or, b) the skin provides a tank of several blocks joined/glued together to form larger tanks forming a variety of shapes that can be conforming to, and fill, selected spaces. In embodiments, several blocks of porous carbon are epoxied together forming a block, where internal vias free of glue can be used as internal manifold for gas flow and the external skin still contains the gas. The assembly can be further strengthened by an exoskeleton that can also be used as a manifold and attachment to the rest of the system.

An aspect of the invention provides a gas storage and delivery device disclosed herein comprising multiple components distributed in smaller units interconnected wherein several impermeable block units are joined together by appropriate pipes in distributed geometry that matches available spaces in the system. The smaller units can be interlocking or complementary such that there is no dead space between units, thus maximizing space efficiency.

In embodiments, the monolith is primarily microporous with interconnected pores of: pore diameters<2 nm, minimized mesoporosity (2-50 nm) and macroporosity (>50 nm).

An aspect of the invention provides a fluid storage and delivery device comprising: a sorbent material with high capacity for adsorption of said fluid, a primary skin that makes the sorbent impervious to such fluid, charging/discharging units that allow to load/fill and unload/discharge the system to external sources or loads or piping and an optional attached or built in shelf/case that protects the sorbent and allows for connection to external frames for gas flow, mechanical and/or thermal functions.

These and other embodiments will be apparent to the skilled artisan based on the disclosure provided herein, including the examples and claims.

DETAILED DESCRIPTION OF PARTICULAR EMBODIMENTS

The technical field of the invention relates to materials, methods and apparatuses for producing a solid porous, light strong, adsorbent material with a thin impervious skin so that gases can be stored at capacities equivalent to those obtained at high pressures using conventional gas cylinders or tanks. Although the method disclosed can be applicable to a variety of non-condensable gases, it will be described here using natural gas (CH4) to illustrate the advantages of such approach.

The current approach eliminates the traditional heavy-walled pressure container vessel in which the sorbent is contained. The requirements on the sorbent are reduced while still matching the performance of CNG by developing a multifunctional carbon sorbent as a monolithic material that is both capable of adsorbing large amounts of NG and in a shape that is mechanically capable of containing the 35-bar pressure without the need for an external tank. In embodiments, this is accomplished by molding and shaping a polyvinyledene dichloride (PVDC)-based precursor (or other such material as described herein) before pyrolysis so that the final carbon produced effectively has 100% conformability and 100% packing density. Such a high conformability eliminates the dead volume between sorbent granules and around the steel pressure container. The shaped monolith with a surface sealing skin eliminates the dead weight of a traditional steel container.

In embodiments, the invention provides a monolith of a porous strong material with a built-in strong, impervious skin so that it can adsorb large quantities of a gas under modicum pressures. The monolith can act as a substrate to form the skin. The monolith can be provided with a feed channel or a plurality of feed channels to charge/discharge the gas on demand. The rest of the monolith's surface is rendered impermeable by a surface treatment so that a strong adherent skin is formed on the surface of the adsorbent material that acts as the container at a very small fraction of volume and weight of a normal heavy-walled tank. A further function of the skin is to distribute the stresses due to the pressure differential between the inside and outside of the monolith throughout the body of the material.

Sorbent Material and Monolithic Sorbent

Herein, a carbon or sorbent material having large areas and at the same time having high densities (to decrease the required volume) is used to preclude the need for bulky tanks to contain them. Herein is described such sorbent material, and such materials containing a strong impervious skin that contains the gas at pressures as high as 35 bar.

A preferred carbon material has physical properties:

| Parameter | Value |
| --- | --- |
| Bulk Density | 1.12 g/cm$^3$ |
| Heat Capacity | 0.9-1.2 cal/g · K |
| Coefficient of Thermal Expansion | 3.2 × 10$^{-6}$/K |
| Ash Content (ASTM D2866-94) | <0.1% |
| Thermal Conductivity | 1.2 W/mK |
| Pore Size Distribution (narrow, tunable) | 0.5-0.8 nm w/0.02 nm precision |
| BET-N2 Surface Area | 1026 m$^2$/g |
| Micropore Volume (fraction) | 0.41 cm$^3$/g (45%) |

The shapes made with this carbon have a high bulk density and micropore volume, a narrow pore size distribution at the range of interest, high thermal conductivity, and low thermal expansion. The material can be formed into various geometric shapes. In one preferred embodiment, the carbon is manufactured by ATMI® as BRIGHTBLACK® Carbon (BBC). BBC is a microporous carbon material with very little mesoporosity. It is derived from polymer precursors without added binder, and has high particle density, $\rho>1.0$ g/cm$^3$; high micropore volume (particularly in ultramicropores), vm>0.4 cm$^3$/g; high compression strength, >20 kpsi; and Low ash content (high purity), <0.1%.

It should be clear that other carbon porous materials including those obtained from similar precursors such as SARAN or other PVC materials or other carbon precursors or other materials such as Alumina, SiC, BCx, Si$_3$N$_4$, SiON$_x$, SiAlON, etc. can also be considered. Furthermore, other reactive gases may be used to provide other sorbent materials where appropriate. Other sorbent materials include silicates, alumina, aluminosilicates, AlN, metals, carbides, oxides, nitrides, borides and mixtures or composites thereof.

An aspect of the invention provides a method for producing a monolithic sorbent that has high surface area (e.g. >100, 500, 1000, or 1300 m$^2$/g), high density (e.g., greater than 0.5 g/cc and most preferably >1 g/cc), and interconnected pores with some hierarchical (e.g., fractal) structure. In embodiments the pores are typically larger than 0.5 nm but smaller than 1.5 nm and most preferably around 0.7, 0.8, 0.9, or 1 nm in width. The sorbent also has high strength (e.g., Tensile Modulus>2 Mpsi; Strength>1 kpsi; flexural strength>2. kpsi). In embodiments, the monolithic material is mechanically strong and chemically inert.

In embodiments, the monolithic material is selected from strong light materials containing mostly light elements including but not limited to C, B, Si, Mg, Al, Ti, and the like, or compounds such as carbon compounds, silicon carbide, silicon nitride, SiONx, AlON, AlN, Al$_2$O$_3$, MgO, BC, and any other similarly strong inert material capable of being produced with the properties listed above.

In embodiments, the monolith is made of carbon, and the surface area is over 1000, 1500, or 2000 m$^2$/g.

In embodiments, the carbon is produced by pyrolysis of a natural product such as olive pits, corn cobs, or by pyrolysis of a polymeric precursor such as PVC.

In embodiments, the carbon is produced by ATMI® under the label BRIGHTBLACK® Carbon (BBC).

In embodiments, the carbon material exhibits the following properties: the carbon material has both a high surface area and a high density (this combination is necessary to achieve the high volumetric capacity needed); the carbon material has the right distribution of porosities so that methane adsorption is maximized; the carbon material is electrically and thermally conductive so that heat transfer will also be fast during loading and discharging; the carbon material is very strong mechanically; and the carbon monolith components can be shaped and stacked in a variety of forms so that they can be adapted and distributed to spaces available in a car structure such as a trunk or the like. BBC is an example material that exhibits such properties.

Another important advantage of using BBC is the ability to manufacture solid rectangular shapes with rounded edges is that they can be stacked in a variety of configurations to take advantage of empty usable spaces in the vehicle so a distributed tank can be incorporated with minimum impact in the volume of the trunk.

In embodiments, the sorbent is a composite containing two or more materials. For example, the material for the sorbent includes strong macroscopic sponges filled with high surface area materials. As an example of such, the sorbent is a SiC strong sponge filled with a high surface area carbon or a carbon precursor. As another example, the sorbent material is a foam of Al or Ti metal (with or without a nitride coating) with open pores larger than 1 micron and preferably more than 1 mm and low apparent density, wherein the foam is filled with a very high surface area sorbent such as a carbon or zeolite or MOF with angstrom sized pores. Sponges and foams can be prefabricated or cofabricated by any available procedure.

In embodiments, the sorbent is a system that is a composite or comprises several blocks glued or otherwise adhered together. For example, the sorbent consist of several blocks joined/glued together to form larger structures forming a variety of shapes that can be conforming to and fill selected spaces. For example, several blocks of porous carbon can be epoxied together forming a block where internal vias free of glue can be used as internal manifold for gas flow and the external skin still contains the gas. The assembly can be further strengthen by an exoskeleton that can also be used as a manifold and attached to the rest of the system.

In embodiments, the sorbent is a system that comprises several pieces distributed in smaller interconnected units. For example, several impermeable block units can be joined together by appropriate pipes in distributed geometry that matches available spaces in the system.

Impermeable Skin

In an embodiment, an adherent impervious strong thin skin is formed on the monolith's surface (except for an opening(s) to charge/discharge the gas and that will be connected to an outside manifold, as described herein). The skin has strong chemical stability and it does not degrade or is not appreciably attacked by species that may be present in the stored gases as described herein (e.g., natural gas, hydrogen, CO2, or other industrial gases). The skin can be a simple coating or can be a composite material.

The surface is made impermeable to stored gases by chemical treatments that plug the surface pores and form a strong skin of a material that is the same or different from the monolith material, provided that the adhesion, strength and impermeability characteristics described herein are obtained.

In embodiments, the skin forming material is a polymer, metal, carbon, or a composite of materials, and/or is prepared in situ from the sorbent materials. For example, the sorbent acts as a substrate upon which a reaction with a reactive gas or liquid occurs, such reaction forming the skin.

In embodiments, the skin is formed by coating the monolith with a polymeric precursor that can be converted into a strong polymer (such as Kevlar, Zylon, and other polymers) and a nanocomposite material with the monolithic sorbent material surface. Alternatively or in addition, such materials can be pyrolyzed to form the skin.

In embodiments, the skin material is selected from metals such as Ti, V, W, Ta, Co, Ni, Al, or any of its alloys or compounds such as TiN, TiC, TiON, (etc.), VN, WN, WC, or any graded or layered composite thereof. Metals and similar materials may be directly deposited onto the external surface of the monolith using any known method of deposition.

In embodiments, the method to form the skin consists of a treatment step such as a coating step (e.g., dip coating, CVD, PVD, plasma spraying). The treatment step may further include pyrolysis of precursors of carbon including graphene sheets, diamond like coatings or any of the materials enumerated above. The treatment step may further include the application of epoxies or other glues/adhesives.

In embodiments, the skin is less than 5, 3, 1, 0.5, or 0.1 mm thick.

In embodiments, the skin is further reinforced by a second layer of material (a "second skin") that include conventional wrapping materials and techniques to form gas tanks including C-epoxy, glass fiber-polymer, strong polymer fibers such as Kevlar, Zylon, steel wires, belts, tapes, metallurgical coatings or any similar reinforcement. For example, the same epoxy used to form the first impervious layer can be used to glue an external foil, plates, a composite skin, or an external case to the adsorbent monolith/skin system. For example, a steel or glass fiber reinforced external case can be prefabricated and then filled with the sorbent body or wrapped around the sorbent body or attached using any of the well known techniques to coat or wrap around or encase a body. The external case can be glued/sealed against the first coating using the same epoxy to form a sorbent/epoxy/steel laminar composite. Alternatively, if a metal coating is used for the first sealing coating, a second metallic structure of composite can be attached to the first by gluing, soldering, brazing or any other attaching procedure.

In embodiments, the skin material comprises an epoxy. In embodiments, the skin material comprises a carbon fiber material. In embodiments, the skin material comprises an epoxy-impregnated carbon fiber material. In embodiments, the carbon fiber material is a carbon fiber composite.

In an embodiment, the device comprises a coating layer of a metal deposited directly on the carbon monolith surface. The metal coating adheres well to the carbon monolith and provides a strong, impervious skin. For example, a Ti or a Ti alloy coating adheres well to the carbon surface by forming TiC bonds. The metal layer can be overcoated with additional layers to provide improved performance. For example, a conformal TiN coating layer (i.e., on top of the Ti or Ti allow coating layer) provides a diffusion barrier and restarts nucleation on the next layer to make the nanograin layers tougher. A subsequent conformal Ti layer (i.e., on top of the TiN coating layer) may be deposited, particularly where such layer is followed by another metal layer to function as an interface for additional components. For example, the interface layer may be a Ni layer. The Ni layer can form NiTi alloys with the underlying Ti layer, and is useful to braze or solder other components such as inlet tubes. This last layer may be deposited only in selected areas to provide a platform for connections.

The various metal coating layers described above can be deposited in a variety of ways, including physical vapor deposition (PVD), chemical vapor deposition (CVD), electrochemical deposition, and the like, as well as combinations. Examples include sputtering, thermal or e-beam evaporation, arc coating, IBAD, and plasma spraying.

In embodiments, sputtering is used. For example, the coating is line of sight, but given a large ratio of thickness of the coating to width of the pores in the monolith, it covers all holes. The coating can be applied to a monolith after some polishing has been performed to decrease the surface roughness to below a few microns. This can also be accomplished by addition of plugging slurries such as those of nanoparticles of pyrolyzable material or by simple infiltration of nanoparticles to block the larger pores and smoothen the valleys. Inks, gels, and polymeric species, can be used for this purpose. Using the monolith as a filter is an alternative approach.

The grain growth is dominated by the formation of TiC islands and the growth of vertically aligned Ti nanocrystals that coalesce and form a solid-impervious barrier at nm scales. The formation of TiN, by adding N2 or NH3 or a similar source of N during the deposition process, will further seal the system and will provide a second nucleation growth surface for the subsequent layer of Ti metal (or any of its alloys with Al, V, and/or Ni). The Ti grains will grow and coalesce to form a compact film. The thickness of the layer will be determined by the nanostructure observed. By repeating this process steps, a layered structure can be obtained that is very impervious, strong, and tough given its structure. The multilayer nitrides can reach a high hardness, such as a hardness of over 15, 20, 25, or 28 GPa. Accordingly, very strong films are possible for forming a skin that can contain the contained gases.

An alternative to PVD techniques is CVD, which allows coating within pores and other non-line-of-sight coating. Accordingly, a nanocomposite material can be constructed in situ by infiltrating vapors into the monolith pores to build a strong metal-carbon nanocomposite. For example, atmospheric or plasma-assisted CVD can be used. For example, vapors are penetrated into the pores of the monolith to a specified depth, such as 5, 7, or 10 microns deep. Part of the metal coating therefore forms within the pores, and the metal forms a carbon-metal compound at the pore surfaces. Above the porous surface, a bulk layer forms by normal deposition. Thus, the process ultimately results in a coating 1000 times thicker than the smaller pores and over 100 times thicker that the largest pores, and fully integrated (both chemically and physically) into the underlying porous monolith. Such a process helps to seal the monolith with a very strong skin. Moreover, since W, Mo, T, V, and other carbide forming-materials as well as their alloys can be deposited at relatively low temperature, and their nitrides or carbonitrides and other compounds can be also formed, this approach produces a composite skin of superior mechanical properties. Furthermore, since deposition rates of microns-per-minute are possible, in less than one hour, a satisfactorily strong coating is possible with minimal processing steps and time.

In an embodiment, a thin metal layer is provided (e.g., by PVD or CVD) that provides good adhesion, and subsequently other coating layers such as alloys or the like are deposited by electrochemical techniques.

In an embodiment, a skin is applied to the surface not just with an epoxy but an epoxy with dispersed nanoparticles of strong particles (e.g., flakes) to increase the strength further. For example, graphite nanoflakes, graphene products, $TiO_2$ or mica is used as the particles. In embodiments, the epoxy contains a conductive powder or flakes or filaments or fibers that strengthen the skin and/or make it conductive. The filler loading should be enough to provide mechanical strength including abrasion and impact resistance, toughness, and thermal conductivity.

In an embodiment, glass fiber/epoxy is used to form the skin.

A further function of the skin is to distribute the stresses due to the pressure differential between the inside and outside of the monolith throughout the body of the material. A further function is that the skin acts as an external casing that encapsulates/protects the internal contents (monolith, etc.) from degrading activities or components such as water vapor or light.

In embodiments, the skin is impermeable, is directly generated/deposited/made/manufactured on the surface of the sorbent, and has some or all of the following properties: it is mechanically strong enough to hold 35 atm of pressure and preferably up to 50 atm and most preferably up to 100 atm; it is practically impervious so that the pressure can be held/kept for weeks and preferably months; it is hard and scratch resistant; it is impact resistant; it is thermally conductive; it is chemically inert to the external atmosphere and the NG components; it has very low corrosion rate so that it can last for years; it can be integrated with feeding/charge/discharge ports; it can be integrated with a secondary envelope for what could be a secondary containment skin (e.g., the second layer of material described herein); it can be connected to mechanically appropriate subsystems for attachment to the external world; it can be thermally connected to external sources of heating and/or cooling.

The first skin or the skin plus second skin designs can be provided with the right geometry and materials for maximizing mechanical ruggedness and connections to the external world. For example, the metal casing can be provided with corrugations that can help to absorb external mechanical loads or impacts, and with connections and, at the same time, function as heat dissipation units. For example, steel or aluminum laminas can be provided with U shape channels or grooves running along the surface that can be used for improved gas flow, for added mechanical strength, for attachment of heat pipes or phase changing materials or for better heat transfer, or as better mechanical and vibration insulation attachments or preferably for a combination of those functions. For example, heat pipes in shape of fins can be used externally for heat management and grooves inside can be used for better gas distribution.

Configurations and Methods

In embodiments, the device has at least one (and possibly 2 or more) opening (i.e., hole or port or conduit) in the skin. The opening(s) may include a charging port and/or a discharging port, or a single port may function as both charging and discharging port. The opening(s) may include an attached connector and may be connected to a tube with a valve. The ensemble is capable of sustaining at least 35 bar of pressure across all components (and more, e.g. 100 bar, as described herein) so that gas can be loaded and delivered from the monolith at such pressures.

In embodiments, the device further comprises a ring of a metal (such as Cu, Ni, Co, Fe, Al or Ti) that is deposited around the opening (e.g., around a charging port) and on top of the skin so that a mating tube with a flange can be glued, soldered, or brazed to the monolith surface, and so that the ensemble is gas tight to pressures over 35 bar.

Charging and discharging gas into/out of the sorbent may generate heat, so the device may be equipped with a heat transfer device or material. For example, such heat transfer may be provided by a circulating conductive fluid that bathes the monolith(s). The fluid may be contained by an external casing, provided that the external casing is lightweight. Such fluid may also be used to heat the monoliths where heating is desired (e.g., during discharge).

In embodiments, discharge of the stored gas may require an input of heat. Such input may be provided by resistance heaters. In embodiments, heating and/or cooling is provided by pipes (e.g., heat pipes or cooling pipes) inserted in the bulk of the sorbent.

In embodiments, the sorbent is a carbon sorbent and is heated and cooled by a fluid bathing the monoliths.

In embodiments, the sorbent is a carbon sorbent and the carbon is heated by passing an electrical current through the monolith.

Stored gases include natural gas, hydrogen, CO2, industrial gases, other volatile hydrocarbons, etc.

The opening(s) in the skin are used to make connections with external components. Such components include fuel lines, charging stations, meters, and the like. The material used for the skin (e.g., a carbon or polymer material, or a metal material, or a composite) determines the method for attaching such connections, and such methods are generally known. For example, for a metal skin such as a Ni external coated skin, brazing or soldering may be used to attach external tubes or manifolds, etc.

In an embodiment, a plurality of openings are present, such as in an array of openings. A manifold to connect such an array of openings/channels with the external tubing could be built into the manifold/head. For example, they could be machined into the head and matched to the entrance ports in the carbon or metal skin.

In an embodiment, a charging/discharging manifold is built into the device during the pyrolysis step. For example, the manifold facilitates the adsorption and desorption rates and even the degassing during the pyrolysis of the polymer. For example, porous tubes are inserted inside the polymer body so that when degassing starts the HCl and other gasses can diffuse to, and be released easily through, these openings. The tubes can be made of a more porous and pyrolyzable polymer, e.g., a porous materials such as carbon or ceramic. It can be steel (although steel may be attacked by the HCl), but as long as it is conductive, an electrical current (applied or induced) can be used to heat the tube directly so that the pyrolysis starts near the tube and progresses radially out to occupy most of the volume of the monolith. By spacing the tubes appropriately, both the temperature profiles and the degassing rates can be optimized. Furthermore, if the porous body near the tubes has some larger pores, it may help the rate of gas transfer without changing the overall density and capacity significantly. Finally, the temperature and pressure gradients can be used to maximize the strength of the skin of the body so that it is impervious. If the external walls containing the original polymer are impervious, the gas evolution will follow paths toward the interior channels and result in a compact impermeable skin.

The charging conduit can be a tube that is inserted into the entrance to the charging/discharging manifold of the adsorbent body and that it is glued to the sorbent walls or body by an adhesive phase. The sorbent/tube/external ambient interface can be sealed by a material that is the same as the skin material or can be a different material. For example, the same epoxy used to seal the skin can be used to glue and seal the charging conduit tube. The tube can be made of a metal, or composite, or reinforced plastic. The gas flow in and out of the sorbent can also be distributed by providing external feeding lines that allow the gas to diffuse along vias with uncoated sorbent. In the simplest design, L shaped corners with an internal groove can be attached/glued to the uncoated edges of a tank so that they provide both a gas feeding system and extra strength for the tank. Other arrangements are possible.

In an aspect there is provide a gas storage and delivery device as disclosed herein, wherein: the device further comprises a vibration mitigation interface. In embodiments, the vibration mitigation interface comprises a vibration mitigating material such as foam or spring(s). An example vibration mitigation material is a macroscopic sponge material. In embodiments, the vibration mitigation interface is positioned between the monolith and the skin, and/or is operative to reduce transmission of vibrations between the skin and the monolith. In embodiments, the vibration mitigation interface is positioned external to the skin, such as within a bathing fluid (i.e., a temperature control fluid) surrounding the skin of one or more devices.

In one embodiment of this invention, a method for producing a solid monolith is provided that involves using a porous carbon coated with an epoxy, carbon, or a metal such that a skin is formed having a strong interface between the monolith and the skin. In some such embodiments, the In an additional embodiment, a method for producing a porous solid monolith with a skin is provided, the skin comprising a charging port and appropriate connection to external devices or gas sources/sinks.

In another embodiment, a plurality of monoliths with their corresponding skins and feeding ports can be stacked and attached to a manifold to provide high volumetric capacity and conformability to available volume space.

In a further embodiment, an adsorbing monolith with an impervious skin and an opening (e.g., combined charging and discharging port for natural gas) is provided.

In embodiments, the mass of any external containment vessel is low or negligible because it needs to contain only the heat transfer fluid. In this case, to store a mass of natural gas equivalent to a CNG system, the gas to sorbent ratio needs to be only 0.13 g/g. This concept takes advantage of the high strength of the BBC shapes to act as the pressure vessel by adding an impermeable skin on the carbon monolith external surface. For example, application of a high-strength epoxy forms a carbon-epoxy composite skin. Such a composite block with nanostructured sorbent can safely maintain pressures well above 35 bar. In embodiments, an extra level of protection is provided by wrapping carbon fibers or another material as describe herein in the epoxy coating. In this case, the increase in weight and volume with respect to the bare monolith will be less than approximately 5, 4, 3, or 2%.

The invention provides a system to store and deliver Natural gas at 500 psi with similar capacity to a normal compressed Natural gas at 3000 psi. The system is light and strong (e.g., has weight and strength/durability characteristics meeting or exceeding previous devices and current minimum requirements for fuel applications). Because the system does not need a bulky heavy tank the total energy density is high. Because the pressure required is only 500 psi, low cost compressors are available even for home use.

By eliminating the dead weight of the heavy-walled pressure tank and minimizing the dead space both inside and around the tank, the performance of the disclosed adsorbed natural gas system is enhanced to meet the performance of high-pressure CNG storage, specifically the system will store NG with a volumetric energy density of >7.4 MJ/l and a gravimetric energy density of >5.9 MJ/kg.

Figure 1:
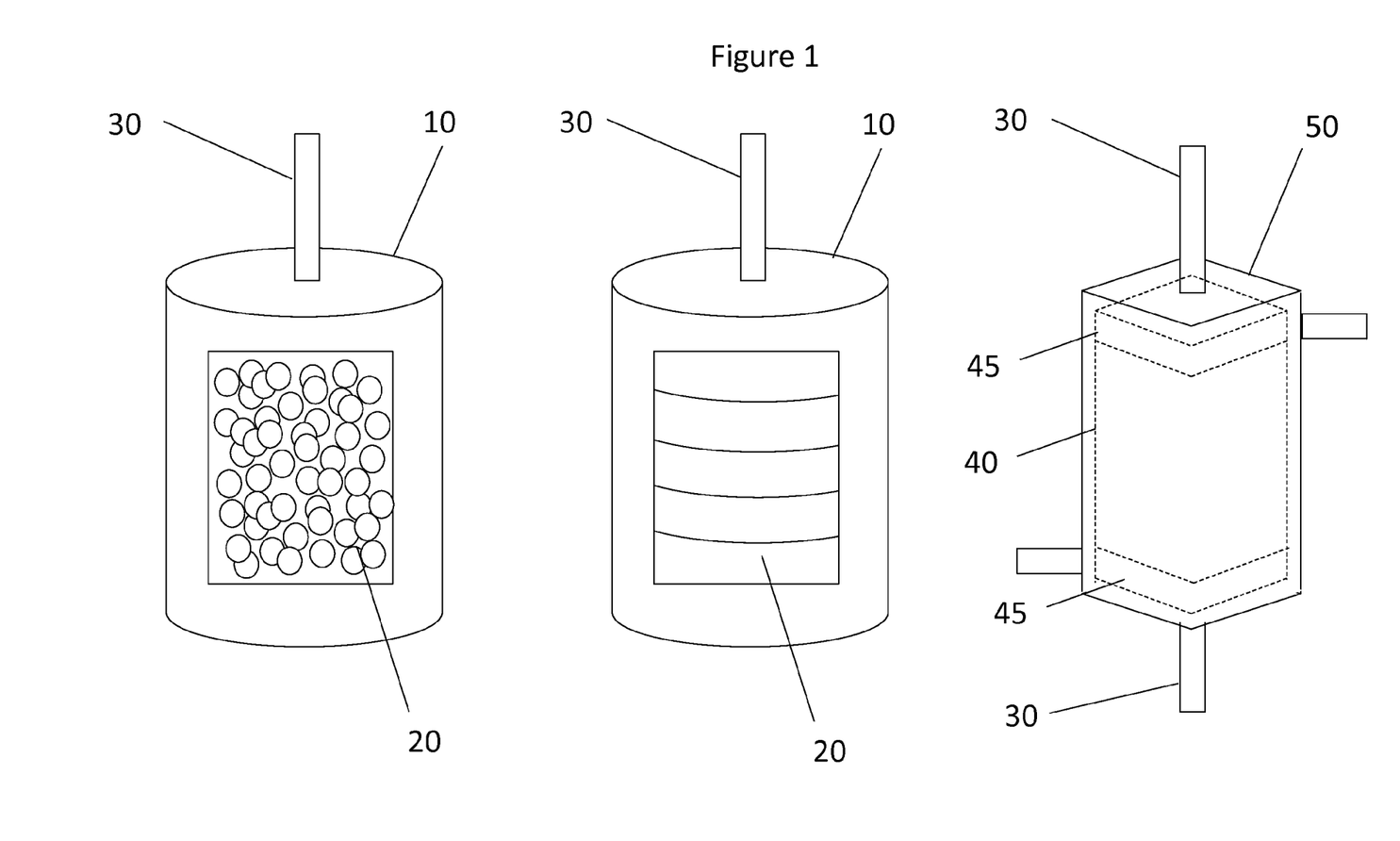
FIG. 1 shows two devices according to traditional designs, using a heavy-walled container, and one device according to the invention, using a thin walled vessel and epoxy coated sorbent bars.

FIG. 1 shows a traditional pressure tank with porous pellets in the left-hand image. Pressure tank 10 is heavy-walled and made of thick metal. A window cut-out is shown in the tank in order to reveal the porous pellets 20 within tank 10. This is a conventional design, defined by $V_{total}=V_{sorbent}+V_{empty\ space}$ and $W_{total}=W_{sorbent}+W_{absorbed}+W_{tank}$. The middle image of FIG. 1 is also a conventional design, and provides a system using discs 20 of a porous material to fill the inner volume of tank 10. Again, the discs are visible in the image through a cut-out in the tank. Such system is defined by $V_{total}=V_{sorbent}$ and $W_{total}=W_{sorbent}+W_{absorbed}+W_{tank}$. The right-hand image of FIG. 1 provides a system according to the invention, with a tangible skin-protected monolith in which the volume of sorbent is maximized and total weight is minimized. This system is defined by $V_{total}=V_{sorbent}$ and $W_{total}=W_{sorbent}+W_{absorbed}$. Skin 50 is light-walled (compared with tank 10) and within the skin is shown (by dotted lines) monolith 40 and end-cap 45. In each image, port 30 is shown for charging and/or discharging the device.

Figure 2:
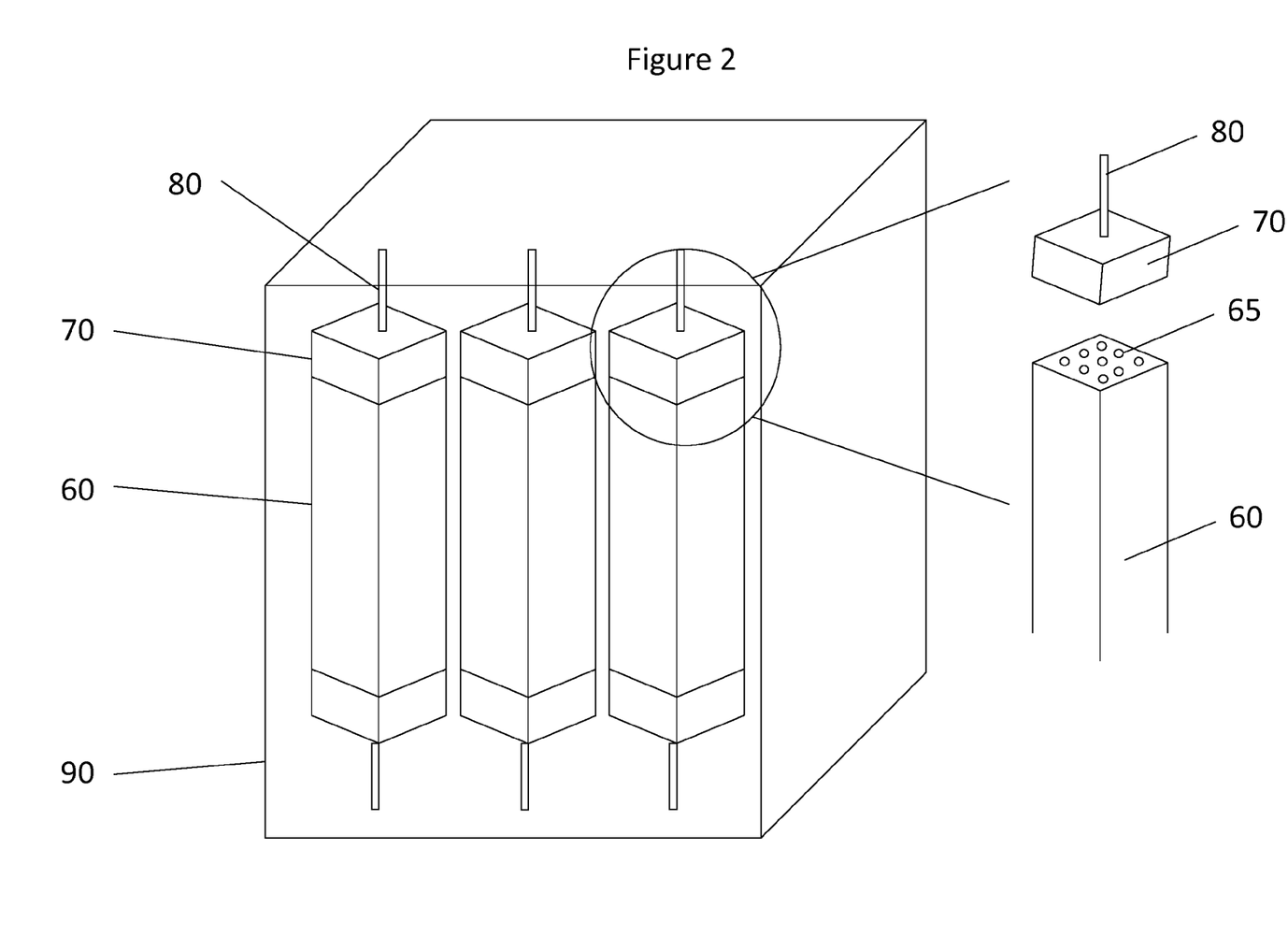
FIG. 2 shows a device according to the invention, using end cap, 1 mm channels, and graphite fiber epoxy.

The invention allows for the manufacture of solid rectangular shapes with rounded edges that can be stacked in a variety of configurations to take advantage of empty usable spaces in a vehicle, e.g., so a distributed tank can be incorporated with minimum impact in the usable volume of the trunk. FIG. 2 showns a plurality of carbon monoliths 60 (a single row of three are shown, but more may be present), each made impervious by a surface adherent layer and provided with metallic caps 70 glued to the ends. The caps provide connecting end caps 80 to an external manifold (not shown). The space surrounding the monoliths can be bathed by heat exchange units (e.g. conductive liquids, etc.) in a thin-walled vessel 90 using conventional thermal fluids and thermal managements systems. A blown-up image portion of the circled portion of a monolith 60 is shown on the right-hand side of the figure, with the cap 70 separated from the monolith to expose a plurality of 1 mm channels 65 in the monolith.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. Any combination of the embodiments described herein is intended to be part of the invention, as if all such combinations had been laboriously set forth in this disclosure.

EXAMPLES

Example 1

Preliminary Results with Carbon

The relatively high storage capacity of our baseline sorbent (ACS-1) was demonstrated. Adsorbing CH4 in BBC carbon under higher pressures was demonstrated.

The baseline sorbent and improved microbeads of the sorbent were manufactured by ATMI and have been tested for $CO_2$ adsorption. Similar improvements can be made for the sorbent designed for NG storage to achieve the volumetric density targets. Preliminary data on methane adsorption of modified carbon sorbents made by ATMI have been reported. The BET-N2 surface area of the carbon was increased from 940 to 1586 $m^2/g$ by various treatments. The methane adsorption capacity can be increased by more than 20% by post-treatment of the starting material. The $CH_4$ adsorption capacity of a treated sorbent on a weight basis increased to 12 wt %, compared to the base sorbent.

The high mechanical strength of the carbon monolith was demonstrated. This and other properties of the BBC are as follows: Compressive Strength (ASTM D 695-02a)=23.3 kpsi; Compressive modulus=2.6 Mpsi; Poisson's Ratio=0.19%; Tensile strength (ASTM D 3039M)=1.7 kpsi; Tensile modulus=3.4 Mpsi, Poisson's ratio=0.2; Flexural strength=3.6 kpsi; attrition resistance (Microbeads, ASTM-D5757)<0.01%/hr.

To help evaluate the strength needed for the sorbent tank, simulations were performed on a representative tank section with connected porosity. The total porosity was 30% of the volume made up of interconnected channels in 3-directions. The tank was then pressurized to 500 psi, and the resultant stresses in the carbon were calculated. The simulations were performed using LS-DYNA, an advanced 3-dimensional finite element program. The tank geometry used in the simulation comprised a 2-in square cross section with rounded corners and a 2-mm diameter hole at the center. The porosity extended out to within about 0.010-in of the tank outer edge. The maximum principal stresses in the tank were determined. The peak stresses in tension (1,700 psi) were located around the center inlet hole. Most of the tank cross section had peak-tension stresses on the order of the gas pressure (500 psi); the rounded corners had all stresses in compression. The tensile strength of our baseline sorbent is 1700 psi, sufficient to contain the gas at 500 psi.

With a maximum stress of more than 3 times the gas pressure, the stresses in the sorbent tank are significantly less than in a traditional pressure vessel because the matrix carries much of the stress. For example, in a CNG tanks described in the literature, the maximum stresses are more than 30 times the gas pressure level (equal to the radius/thickness ratio times the internal pressure). Therefore, the tested design will satisfy natural gas storage requirements.

The required volumetric and gravimetric energy densities are 9.2 MJ/l and 0.4 g $CH_4$/g sorbent, respectively. When the sorbent fills the entire tank, the required volumetric density decreases from 9.2 to 7.4 MJ/l and the gravimetric density decreases from 0.4 to 0.13 g $CH_4$/g sorbent. Data show that the monolith made from the baseline (BBC) material has a capacity of 0.1 g CH 4/g sorbent and can be increased to a capacity of 0.12 g $CH_4$/g sorbent.

Example 2

A BBC cylindrical monolith is provided with a thin gas-impermeable skin of a TiAl alloy by sputtering, and an opening at one of the ends is provided for gas loading. A Ni plated ring is deposited by electrochemical deposition at the opening and a Stainless Steel (SS) tube is attached to the opening by brazing, ultrasonic welding or similar techniques.

Example 3

Figure 3:
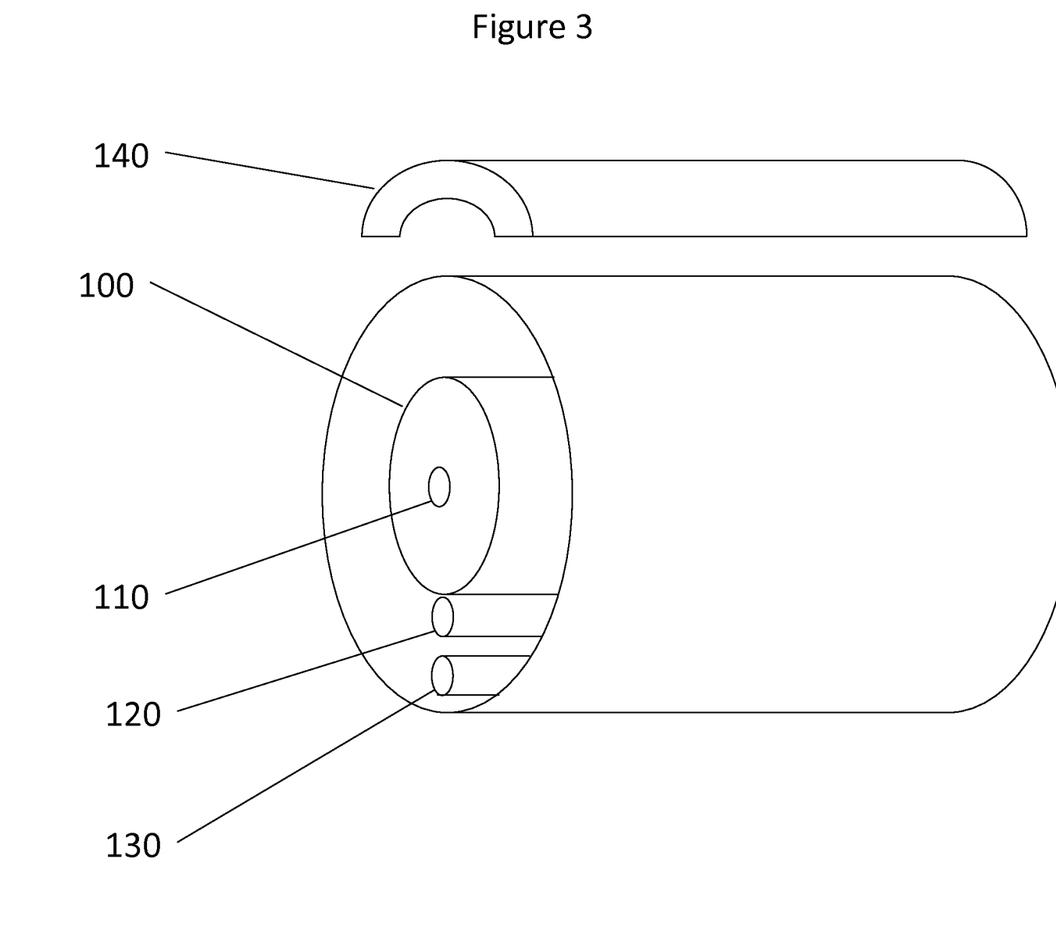
FIG. 3 shows a cylindrical monolith, piping and heater for the production of a device according to the invention.

With reference to FIG. 3, a monolith is exposed to the vapors of a metal halide such as AlCl, $TiCl_4$, VCl4, WCl6, or vapors of their subhalides, for example: AlCl, $TiCl_3$, $SiF_2$, etc. The full halides can be reduced to the metal by H2. The resulting HCl will be pumped through the pores and out of the middle of the monolith until the surface pores are plugged by the M deposition. Note that as pores plug, the gas with the $MX_u$ will be directed to the still open pores, eventually plugging them. Thus rendering them and the monolith impervious, except for a ring around the original hole in one of the ends and used to degas the products of decomposition. Once this first strike is completed, a thicker coating of another material can be deposited on top by any technique.

In FIG. 3, monolith 100 has passageway 110 through which HCl gas is passed. Monolith 100 may be rotated to improve uniformity in the reaction. $H_2$ is passed through passageway 130, and $MCl_x$ passes through passageway 120. Heating element 140 is shown, and may comprise a resistive coil or other heating device.

Example 4

A cylindrical ceramic monolith is fabricated with several inner small diameter channels using any ceramic technique appropriate to get high strength and high porosity. Insert tube or manifold on one end and developing a coating by dipping or immersion in a liquid metal bath. The metal can include Al, AlSi, AlTi, CuSi or similar light strong alloys.

Example 5

Carbon monoliths may be surface treated first before dipping. For example, the monolith can oxidized to produce 'C'=0 groups to which Al, Ti, Si can bond C—O-M providing good adhesion and a strong nanocomposite skin.

Example 6

A monolith of any material can be pre-coated with a thin layer of a metal M by PVD, CVD or any coating technique that produces good adherence, then coated using other coating techniques that are cheaper to obtain the bulk of the skin including spray (e.g., plasma, thermal, cold arc) coating. The coating can be then annealed to anneal stresses and/or diffuse/react at the interface to increase adhesion and strength.

Example 7

During the coating or the original metal, a reactive gas can be pulsed to produce multilayer stronger structures similar to those produced for drilling tools. If we are coating with a reactive metal such as Ti, V, W, Al, Si, etc we can obtained layers structures by adding, for example, $NH_3$ (yielding bands of $MN_x$), $BH_3$ (yielding bands of $MB_y$), $O_2$ (yielding $MO_z$), or $CH_x$ (yielding $MC_f$).

Example 8

A porous carbon monolith is provided. A Ti layer is deposited on the external surface of the monolith. The first coating of Ti is only 70 nm which will be equivalent to a thickness 100 times that of the pore width in the monolith (i.e., 0.7 nm). A second coating of TiN is provided as a diffusion barrier. The thickness of the TiN layer is about 7 nm. The TiN is followed by another Ti coating of about 50 nm, upon which is deposited a final, thicker, Ni coating layer of 2 microns.

Example 9

A 1-liter module of the sorbent (FIG. 2) can be formed from a rectangular shape that is 5 cm on the side and 40-cm long. The shape is sealed on the periphery with an epoxy coating. With 36 channels in a 6×6 array of 0.1-cm diameter distributed uniformly within the rectangular shape, the maximum diffusion distance is only 0.4 cm. This distance is similar to the size of granular sorbents. It was calculated that the gas will diffuse to the channels from the bulk with a reasonable pressure gradient of 4 bar under peak withdrawal conditions. The presence of the channels reduces the packing density of the sorbent by <2%.

Assuming that the heat of desorption is 16 kJ/mole, the amount of heat that needs to be supplied through the 1-liter monolith walls is calculated to be 55 watts or 695 J/(s·m²) based on the peripheral area. A simple finite element calculation showed that the temperature difference between the center and the periphery of the monolith will be less than 10° C. These two calculations indicate that it is feasible to meet the desorption rate target.

Example 10

Lifetime: The durability target is 100 cycles with no less than 80% of the initial capacity remaining. Data obtained from tested the microbeads of BBC for $CO_2$ capture under coal-fired boiler flue gas conditions for 7,000 cycles indicated no observable degradation. Temperature and impurity tolerance was satisfactory.

What is claimed is:

1. A gas storage and delivery device comprising a porous gas sorbent monolith contained within an adherent skin, wherein:
   the skin is impervious to the gas at >35 atm and comprises a port capable of providing a fluid connection between the monolith and a gas charge/discharge manifold; and
   the monolith comprises properties:
   (a) a surface area of >100 m²/g;
   (b) a density of ≥0.5 g/cc;

(c) interconnected pores with some hierarchical structure and of typical diameter larger than 0.5 and smaller than 1.5 nm;
(d) tensile modulus >2 Mpsi, tensile strength >1 kpsi and flexural strength >2 kpsi; and
(e) chemical stability in that it does not degrade, or is not significantly attacked by species present, in a gas that is natural gas, hydrogen or $CO_2$.

2. The device of claim 1 wherein the monolith comprises a material that is mostly one or more light elements selected from C, B, Si, Mg, Al and Ti.

3. The device of claim 1 wherein the monolith is made of carbon and the surface area is over 1000 $m^2/g$.

4. The device of claim 1 wherein the monolith is made of carbon that is a pyrolysis product of a natural product, or a polymeric precursor.

5. The device of claim 1 wherein the skin comprises a material selected from a polymer, metal and carbon.

6. The device of claim 1, wherein the skin comprises a material selected from metals, metal alloys, or any graded or layered composite thereof.

7. The device of claim 1, wherein the skin is less than 5 mm thick.

8. The device of claim 1 wherein where the skin is reinforced by a second layer of gas tank material.

9. The device of claim 1 wherein the device comprises the manifold in the form of a tube with a valve that sustains at least 35 bar of pressure.

10. The device of claim 1 wherein the device comprises the manifold in the form of a tube with a flange, and a ring of a metal around the port configured so that the ring and flange can be mated so that manifold is gas tight to pressures over 35 bar.

11. The device of claim 1 further comprising a circulating conductive fluid that bathes the monolith and is contained by an external casing, which provides heat transfer during charging and discharging the gas.

12. The device of claim 1 comprising resistance heaters which provide heating during gas discharge and heat pipes in the monolith which provide cooling.

13. The device of claim 1 comprising the gas at >35 atm.

14. A gas storage and delivery device comprising a microporous or nanoporous, gas sorbent monolith contained within an adherent skin, wherein:
the skin is impervious to the gas at >35 atm, and comprises one or more ports, each capable of providing a fluid connection between the monolith and a gas charge/discharge manifold; and
the monolith comprises microporous or nanoporous carbon.

15. The device of claim 14 wherein the microporous carbon comprises properties:
Bulk Density 1.12 $g/cm^3$;
Heat Capacity 0.9-1.2 cal/g.K;
Coefficient of Thermal Expansion $3.2 \times 10^{-6}$/K;
Ash Content (ASTM D2866-94) <0.1%;
Thermal Conductivity 1.2 W/mK;
Pore Size Distribution 0.5-0.8 nm w/0.02 nm precision;
BET-N2 Surface Area 1026 $m^2/g$; and
Micropore Volume (fraction) 0.41 $cm^3/g$ (45%).

16. A method of using the device of claim 1 for storing and delivering a gas comprising:
introducing the gas into the device under pressure >35 atm.

17. A method of making the device of claim 1 comprising the step of forming the skin on the monolith by coating.

18. The gas storage and delivery device of claim 1 wherein the monolith comprises material encased in a macroscopic sponge wherein:
a) the material is a high surface area carbon or a carbon precursor and the sponge is a SiC sponge; or
b) the material is a high surface area carbon or a carbon precursor or zeolite or MOF and the sponge is a foam of Al or Ti metal.

19. A gas storage and delivery device of claim 1 wherein:
a) the monolith comprises a composite or several blocks joined together; and/or,
b) the skin provides a tank of several blocks joined together to form larger tanks capable of forming a variety of shapes that can be conforming to and fill selected spaces.

20. A gas storage and delivery device of claim 1 further comprising multiple components distributed in smaller units interconnected wherein several impermeable block units are joined together by compatible pipes in distributed geometry that matches available spaces in the system.

* * * * *